Sept. 10, 1963          C. W. ERICKSON          3,103,368
   HYDRAULIC SHOCK ABSORBER WHEEL SUSPENSION ADJUSTABLE FOR
      LEVELLING AND CHANGING GROUND CLEARANCE OF A VEHICLE
Filed March 9, 1962                              3 Sheets-Sheet 1
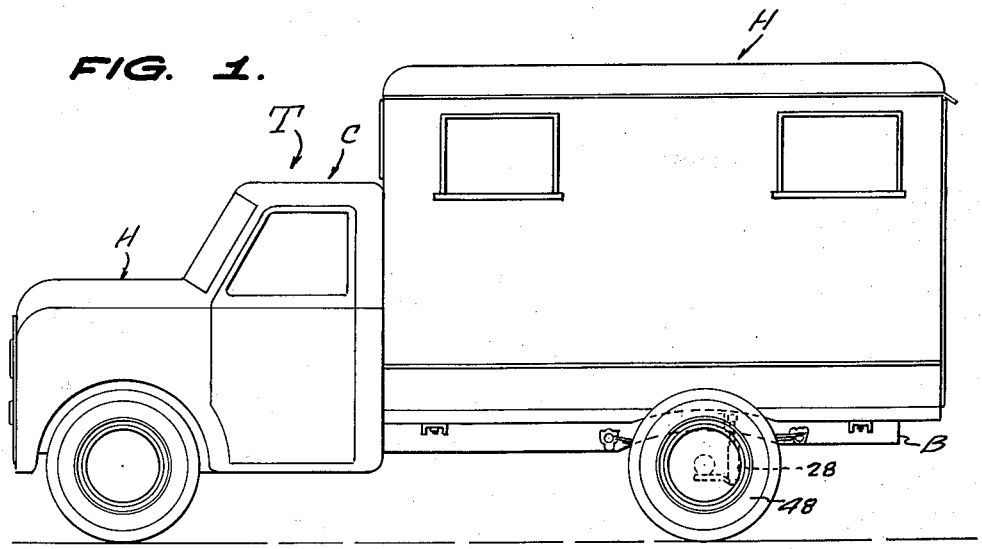
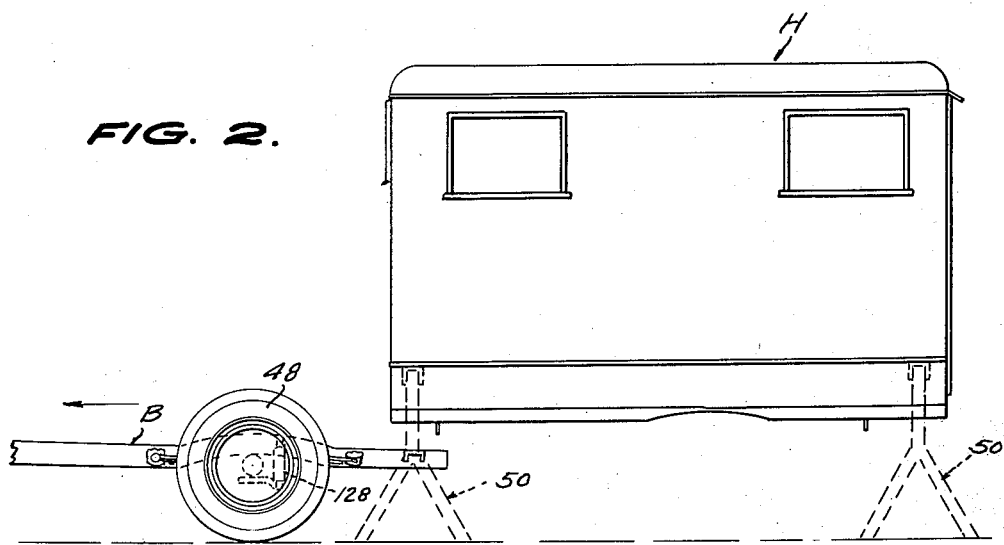
INVENTOR.
CARL W. ERICKSON,
BY
McMorrow, Berman & Davidson
ATTORNEYS Sept. 10, 1963    C. W. ERICKSON    3,103,368
HYDRAULIC SHOCK ABSORBER WHEEL SUSPENSION ADJUSTABLE FOR
LEVELLING AND CHANGING GROUND CLEARANCE OF A VEHICLE
Filed March 9, 1962    3 Sheets-Sheet 2
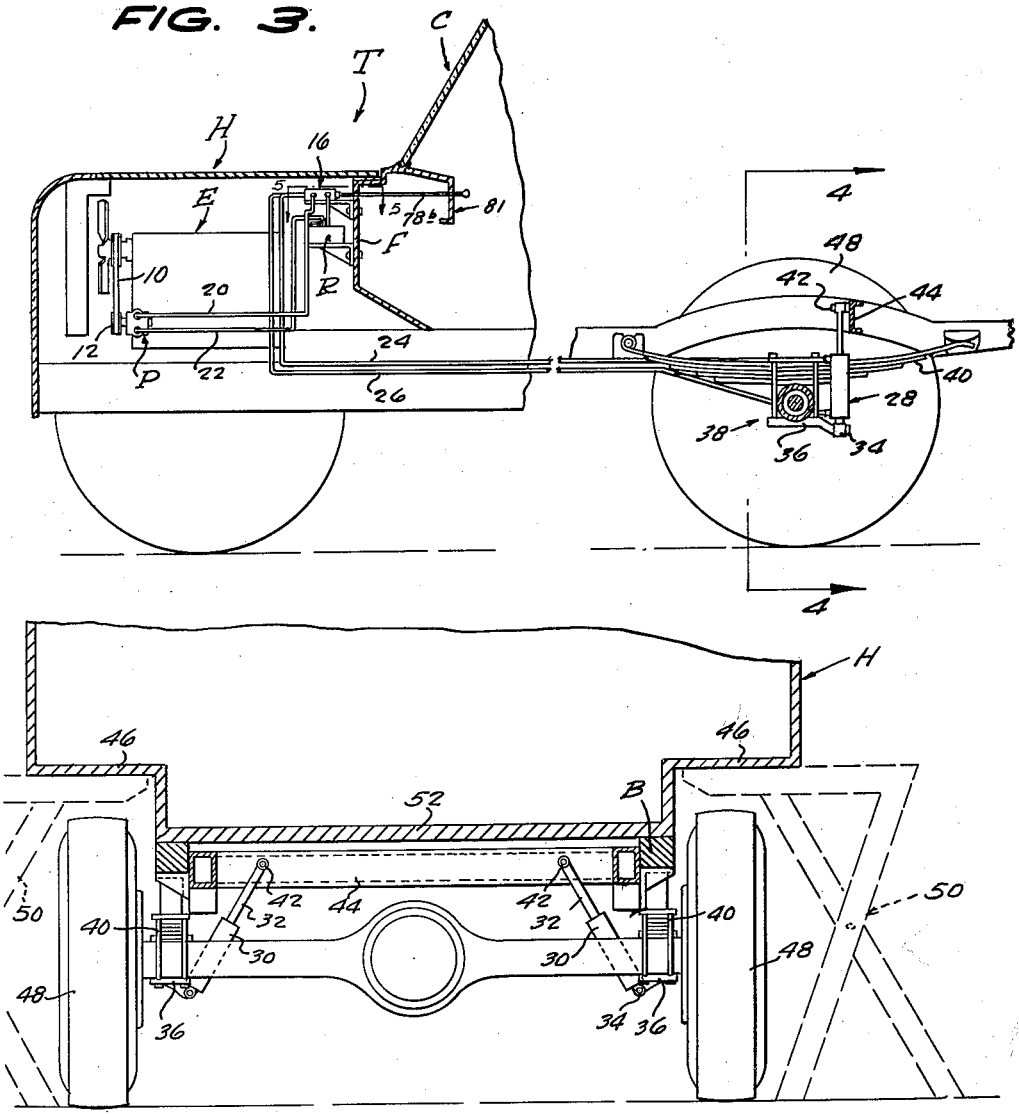
INVENTOR.
CARL W. ERICKSON,
BY
McMorrow, Berman & Davidson
ATTORNEYS.

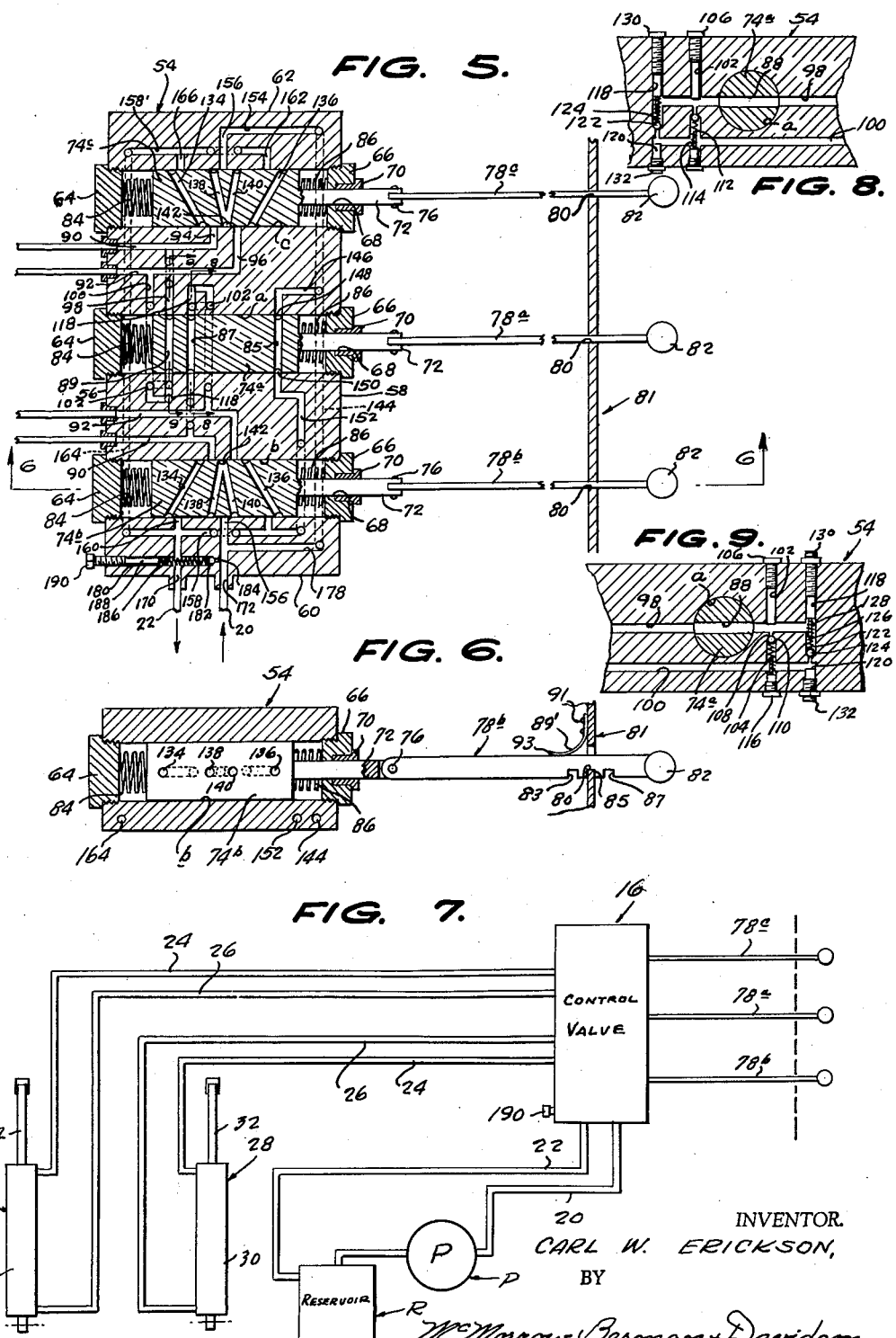

United States Patent Office 3,103,368
Patented Sept. 10, 1963

3,103,368
HYDRAULIC SHOCK ABSORBER WHEEL SUSPENSION ADJUSTABLE FOR LEVELLING AND CHANGING GROUND CLEARANCE OF A VEHICLE
Carl W. Erickson, Box 111, Columbia, Utah
Filed Mar. 9, 1962, Ser. No. 178,681
5 Claims. (Cl. 280—6)

This invention relates to a novel vehicle wheel hydraulic shock absorber suspension which is selectively adjustable for levelling a vehicle on uneven ground, and for elevating and depressing the bed or frame of a vehicle relative to the ground.

The primary object of the invention is the provision of an efficient, simple, easily installed, and easily operated hydraulic suspension of the kind indicated, which can replace the usual hydraulic shock absorbers of the rear axle suspension of a vehicle, or be installed and operated without removal of or incapacitation of these shock absorbers.

Another object of the invention is the provision of a hydraulic suspension of the character indicated above, which is adapted, when installed on a pick-up truck, to be used for such tasks as elevating a body, such as a camper cabin, to enable placing stationary jacks or other foundation members under the cabin, and then lowering the cabin onto the stationary jacks or the like, and for lowering the truck bed, from normal height or clearance above the ground, to a level below the cabin and backing the truck bed under the cabin, preparatory to elevating the truck bed to lift the cabin off the stationary jacks or the like and loading the cabin onto the truck bed after removal of the stationary jacks or the like.

A further object of the invention is the provision of a hydraulic suspension of the character indicated above, which has a hydraulic pump which is adapted to be driven by the engine of a pick-up truck, and a control assembly which is adapted to be mounted on the firewall of the truck and operated by the operator of the truck from within the cab of the truck.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a flat bed pick-up truck embodying a hydraulic suspension of the present invention, showing the truck bed at normal level or clearance and carrying a camper cabin;

FIGURE 2 is a schematic side elevation, showing the cabin on a level above normal level of the truck bed and resting upon stationary jacks, the truck bed being shown depressed below the normal level, preparatory to being backed beneath the cabin and being elevated to lift the cabin off the stationary jacks.

FIGURE 3 is a fragmentary and contracted vertical longitudinal section taken through the truck;

FIGURE 4 is a fragmentary vertical transverse section taken on the line 4—4 of FIGURE 3;

FIGURE 5 is an enlarged horizontal section taken on the line 5—5 of FIGURE 3, showing the valves of the control assembly in starting positions, for shock absorber action;

FIGURE 6 is a vertical section taken on the line 6—6 of FIGURE 5;

FIGURE 7 is a schematic diagram of the connections of the control assembly with the hydraulic pump, the hydraulic reservoir, the relief valve, and the hydraulic shock absorber jacks;

FIGURE 8 is a fragmentary vertical transverse section taken on the line 8—8 of FIGURE 5, showing check valves and adjustable flow valves;

FIGURE 9 is a view similar to FIGURE 8 and taken on the line 9—9 of FIGURE 5.

Referring in detail to the drawings, wherein like numerals designate like parts throughout the several views, a pick-up truck T is shown which has a flat chassis supporting a bed B, extending behind a cab C, in front of which is a firewall F at the rear end of an engine hood H containing an internal combustion engine E, having a fan belt 10. The fan belt 10 is operatively trained over the pulley 12 of a hydraulic pump P which is mounted to the side of the engine E. A hydraulic control assembly 16 is mounted to the front side of the firewall F, and a hydraulic reservoir R is mounted on the firewall beneath the control assembly. As shown in FIGURE 7, hydraulic lines 20 and 22 lead from the pump P to the control assembly 16 and the reservoir R, respectively, and pairs of hydraulic lines 24 and 26 lead from the control assembly 16 to the upper and lower ends, respectively, of a pair of hydraulic shock absorber jacks 28.

As shown in FIGURES 3 and 4, the jacks 28, which are shown as replacing existent hydraulic shock absorbers, can be installed without removing the existent shock absorbers. The jacks 28 comprise cylinders 30 having piston rods 32 extending from their upper ends, the lines 24 and 26 being in communication with the upper and lower ends of the cylinders 30. The lower ends of the cylinders 30 are pivoted, as indicated at 34, to the lower plate 36 of the truck rear axle or differential housing clamps 38, which clamp thereon rear suspension leaf springs 40. The jacks 28 are canted inwardly and the piston rods 32 are pivoted, at their upper ends, as indicated at 42, to a chassis frame cross member 44.

The piston rods 32 of the jacks 28 are adapted to occupy normal positions, relative to the cylinders 30, determined by the tension of the vehicle springs 40 and the weight of a load resting upon the bed B, such as a camper cabin or hut H, carried by the truck T. As shown in FIGURE 4, the cabin H is wider than and has floor portions 46 which extend outwardly beyond the sides of the bed B and the rear truck wheels 48. The piston rods 32 of the jacks 28 are adapted to be extended above their normal position, so that the bed B is elevated above its normal level, so as to raise the cabin H high enough to admit of placing stationary jacks 50 beneath the floor portions 46. When the cabin rests upon the stationary jacks 50 or other foundation means, the piston rods 32 are depressed, so that the truck bed B is spaced downwardly from the cabin floor 52, which rested thereon, and the truck T can be driven forwardly away from the cabin.

When, as indicated in FIGURE 2, the cabin H is to be backed off the stationary jacks 50 and onto the bed B of the truck T, the jack piston rods 32 are depressed enough to lower the bed B below the level of the cabin floor 52 and enable the truck to be backed to put the bed B beneath the cabin floor. The piston rods 32 are then extended upwardly until the truck bed engages and elevates the cabin floor 52 and elevates the cabin off the stationary jacks. The truck T can then be driven away from the stationary jacks or other foundation means and the bed B lowered to normal level by depressing the piston rods 32, to normal level, whereat the jacks 28 operate as ordinary hydraulic shock absorbers.

The extension and retraction of the piston rods 32 of the shock absorber jacks 28, and the shock absorbing action of the jacks 28, are determined by operation of the control assembly 16. As shown in FIGURES 5, 6, 8 and 9 the control assembly 16 comprises a preferably flat rectangular valve block 54 having forward and rear sides 56 and 58, respectively, and left and right hand ends 60 and 62, respectively. The block 54 is formed with three bores extending to the sides 56 and 58. The bores are spaced from the block ends 60 and 62, and from each other, and include a middle bore "a," a left hand bore "b," and a right hand bore "c." The forward ends of the bores are closed by solid screw plugs 64, and their rear ends by screw plugs 66 which have axial bores 68 extending therethrough, and annular packing plugs 70, through which valve stems 72 slide. Cylindrical valve cores $74^a$, $74^b$, and $74^c$ slide in the bores "a," "b," and "c" and are fixed to the forward ends of related valve stems.

The valve stems 72 are articulated, as indicated at 76, to the forward ends of endwise movable control bars $78^a$, $78^b$, and $78^c$, respectively, which slide supportably through slots 80 provided in the truck instrument panel 81, and have knobs 82 on their rear ends, accessible to the driver of the truck T within the cab C. The bars have longitudinally spaced notches 83, 85, and 87, in their lower edges, which are adapted to receive the lower ends of the slots 80, in the forward, intermediate, and rear positions, respectively, of the bars. Leaf springs 89' are secured, at one end, as indicated at 91, to the instrument panel 81, above the bars, and have free lower ends 93 which bear upon and bias the bars downwardly.

The valve cores $74^a$, $74^b$ and $74^c$ are normally urged in intermediate positions by means of helical springs 84, compressed between the solid plugs 64 and the adjacent ends of the cores, and helical springs 86, circumposed on the valve stems 72 and compressed between the plugs 66 and the adjacent ends of the cores.

The middle valve core $74^a$ is a two-way or two-position core and is formed with diametrical ports, which consist of a rear port 85, located near the rear end of the core, and intermediate and forward ports 87 and 89, respectively, located near the forward end of the core. The ports of the valve core $74^a$ are related to sets of passages in the valve block 54, at opposite sides of the middle bore "a," which include passages 90 and 92, opening to the forward side 56 of the block, and to which the pairs of hydraulic lines 24 and 26 are connected. At their rear ends, the passages 90 and 92 have lateral ports 94 and 96 which open to the left and right hand bores "b" and "c." Intermediate their ends, the passages 90 have laterally inwardly extending arms 98 which open to the middle bore "a," for registry with the forward port 89 of the middle valve core $74^a$ in the starting or intermediate position thereof. The passages 92 have inwardly extending arms 100 which lead to vertically aligned upper and lower bores 102 and 104, formed in the block 54, at opposite sides of the middle bore "a," as shown in FIGURES 9 and 8. The upper ends of the upper bores 102 are closed by fluid flow adjusting plugs 106. The upper ends of the lower bores 104 are formed with restricted check valve seats 108 which are normally engaged and closed by check valves 110, urged by springs 112 secured to the stems 114 of plugs 116 engaged in the lower ends of the lower bores 104. The plugs 106 are adjustable for increasing and decreasing the fluid resistance to downward travel of the piston rods 32 of the jacks 28.

The valve core $74^a$ is provided for transferring the action of the jacks 28 from shock absorbers to hydraulic jacks, and to provide for fluid flow from the pump P to the tank R, through the core port 85, when in forward open shock-absorber position. The fluid flow adjusting plugs 106 and 132 control the fluid resistance to downward and upward movements of the jack piston rods 32, in accordance with the road surface conditions, and, as one direction requires more resistance than the other, one or both of the check valves are adjusted to provide for the resistance or resistances required. On the downward stroke of the piston rods 32 fluid is blocked by the check valve 124 and passes through the check valve 110 and the flow adjustment plug 106. By adjusting plugs 106 and 132 the up and down resistances to movements of the piston rods 32 can be set at any desired similar or different levels.

Pairs of registered upper and lower vertical bores 118 and 120, respectively, spaced laterally from the bores 102 and 104, open to the passages 98 and 100, the upper bore 118 having, at its lower end a restricted valve seat 122. The valve seat 122 is normally closed by a check valve 124, urged by a spring 126 on the stem 128 of a plug 130, engaged in the upper end of the upper bore 118. The check valve seat 122 controls passage of fluid from the upper bore 118 to the passage 100. A flow adjusting plug 132 is threaded into the lower end of the lower bore 120, and is adjustable to change the fluid resistance, within the cylinders 30 of the jacks 28, to upward movements of their piston rods.

The left and right hand valve cores $74^b$ and $74^c$ have similar sets of diametrical ports extending therethrough, which consist of forward ports 134, rear ports 136, and a pair of intermediate ports, consisting of divergent dual ports 138 and 140, whose inward ends are connected together as a single intermediate port 142. The cores $74^b$ and $74^c$ are three-position cores, and their ports are arranged to be, at times registered with and out of registry with the jack cylinder fluid pressure ports 94 and 96, and in or out of registry with sets of ports in the block 54, located between these cores and the ends of the block 54. The last mentioned sets of ports are connected together by a rear common transverse passage 144, which extends along the rear side 58 of the block 54. The common passage 144 has a branch 146 which has a port 148 opening to the middle bore "a," with which the port 85 of the middle valve core $74^a$ is registered in the normal or intermediate position of the core $74^a$. In this position, the port 85 of the core $74^a$ registers also with the port 150 of a transverse passage 152 which passes beneath the left hand bore "b" and connects with the set of passages in the left hand end of the block 54.

The sets of passages in the right-hand end of the block 54 consists of a branch 154 of the common passage 144 having a middle port 156, opening to the bore "c," with which either of the convergent ports 138 and 140 are, at times, registrable, a longitudinal passage 158', out of communication with the branch 154, which has forward outlet port and return ports 166 and 162, respectively. The return port 162 is located between ports 136 and 140, and is registrable, at different times with the port 136. The forward port 134 is registrable, at times, with the outlet port 166. A forward common passage 164, extending along the forward side 56 of the block 54, is connected at its right hand end to the longitudinal passage 158', and, at its left hand end, to a longitudinal passage 158, at the left hand end of the block 54.

The left hand end 60 of the block 54 has transverse passages 170 and 172 therein, to which the pump and reservoir lines 22 and 20, respectively, are connected. The passages 170 and 172 open to the ports 160 and 156, which open to the left hand bore "b," and are at times registrable together with the forward port 134 and the forward intermediate port 138. The rear passage 172 is connected to the rear common passage 144 by a passage 178. The valve core ports 140 and 136 are registrable, at times, with the middle port 156 and the rear port 162.

A pressure relief valve assembly, to maintain the hydraulic pressure in the system to a level only slightly above the pressure necessary to extend the piston rods 32 of the jacks 28, is provided in the left hand end of the block, and comprises a longitudinal passage 180 which opens to the forward side 56 of the block 54, and intersects the transverse passages 170 and 172. A restricted valve seat 182 restricts communication between the passage 180 and the passage 172, and is normally closed by a relief check valve 184, urged by a spring 186 on the stem 188 of a plug 190 threaded in the forward end of the passage 180. The relief valve assembly is thus connected between the pressure line 20 and the return line 22, whereby fluid is passed by the pump P to the reservoir R when the valve cores 74ª, 74ᵇ, and 74ᶜ are in their intermediate, neutral or closed positions.

In operation, the middle control bar 78ª is moved in opposite directions, between forward and rear positions, in order to transfer the action of the jacks 28 from shock-absorbing action to hydraulic jack action.

The left and right hand control bars 78ᵇ and 78ᶜ, respectively, are selectively operated for levelling the bed B of the truck T, where the ground surface is canted crosswise of the truck, but are otherwise to be given the same positions. For elevating the truck bed B, the center bar 78ª is pulled to its rearward position, and then the bars 78ᵇ and 78ᶜ are moved rearwardly or forwardly to elevate or depress the truck bed B.

When the desired adjustments of the jacks 28 have been obtained, these adjustments can be securely maintained, simply by moving the control bars 78ᵇ and 78ᶜ to their neutral positions, and leaving the middle bar 78ª in its rearward closed position, in which all of the ports of the related valve cores 74ᵇ and 74ᶜ are out of registry with the related block ports.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a truck having a bed, a fixed axle spaced below the bed, resilient suspension means connected to and interposed between the bed and the axle, vertical hydraulic shock absorber jacks disposed at opposite sides of the truck, said jacks comprising cylinders and piston rods severally pivoted to the bed and the axle, and hydraulic fluid pressure and hydraulic fluid return means severally connected to the upper and lower ends of the jack cylinders, said hydraulic means comprising a control valve assembly, said assembly comprising a block formed with middle, left hand, and right hand bores extending therethrough, middle, left hand, and right hand valve cores sliding in the bores, said middle core being a two position core and said left and right hand cores being three-position cores, first means for individually positioning and setting the middle core in a forward operative open position and a rear closed position, second means for positioning said left and right hand cores in open forward and rear open positions and in an intermediate closed position, said block having first passage means connected to the upper and lower ends of the jack cylinders and having ports opening to the middle bore, said middle core having port means registrable, in the forward position thereof, with said first passage means ports, said middle core being adapted to close said first passage means ports in the rear position of the middle core, said block having second and third passage means related to the left hand and right hand bores, respectively, and having ports opening thereto, the left and right hand cores having forward, intermediate, and rear ports registrable, at times with second and third passage means ports in forward and rear positions of the left and right hand cores, said left and right hand cores being adapted to close the ports of the second and third passage means in their intermediate positions, and fourth passage means in the block connecting the first, second and third passage means together, said fourth passage means having a pressure line and a return line, and common passage means connecting the said passage means together.

2. In combination, a truck having a bed, a fixed axle spaced below the bed, resilient suspension means connected to an interposed between the bed and the axle, vertical hydraulic shock absorber jacks disposed at opposite sides of the truck, said jacks comprising cylinders and piston rods severally pivoted to the bed and the axle, and hydraulic fluid pressure and hydraulic fluid return means severally connected to the upper and lower ends of the jack cylinders, said hydraulic means comprising a control valve assembly, said assembly comprising a block formed with middle, left hand, and right hand bores extending therethrough, middle, left hand and right hand valve cores sliding in the bores, said middle core being a two-position core and said left and right hand cores being three-position cores, first means for individually positioning and setting the middle core in a forward operative open position and a rear closed position, second means for positioning said left and right hand cores in open forward and rear open positions and in an intermediate closed position, said block having first passage means connected to the upper and lower ends of the jack cylinders and having ports opening to the middle bore, said middle core having port means registrable, in the forward position thereof with said first passage means ports, said middle core being adapted to close said first passage means ports in the rear position of the middle core, said block having second and third passage means related to the left hand and right hand bores, respectively, and having ports opening thereto, the left and right hand cores having forward, intermediate, and rear ports registrable, at times with second and third passage means ports in forward and rear positions of the left and right hand cores, said left and right hand cores being adapted to close the ports of the second and third passage means in their intermediate positions, and fourth passage means in the block connecting the first, second, and third passage means together, said fourth passage means having a pressure line and a return line, and common passage means connecting the said passage means together, said hydraulic means comprising a hydraulic pump and a reservoir to which the pressure line and the return line are severally connected, and means connecting the pump and the reservoir.

3. In combination, a truck having a bed, a fixed axle spaced below the bed, resilient suspension means connected to and interposed between the bed and the axle, vertical hydraulic shock absorber jacks disposed at opposite sides of the truck, said jacks comprising cylinders and piston rods severally pivoted to the bed and the axle, and hydraulic fluid pressure and hydraulic fluid return means severally connected to the upper and lower ends of the jack cylinders, said hydraulic means comprising a control valve assembly, said assembly comprising a block formed with middle, left hand, and right hand bores extending therethrough, middle, left hand and right hand valve cores sliding in the bores, said middle core being a two-position core and said left and right hand cores being three-position cores, first means for individually positioning and setting the middle core in a forward operative open position and a rear closed position, second means for positioning said left and right hand cores in open forward and rear open positions and in an intermediate closed position, said block having first passage means connected to the upper and lower ends of the jack cylinders and having ports opening to the middle bore, said middle core having port means registrable, in the forward position thereof with said first passage means ports, said middle core being adapted to close said first passage means ports in the rear position of the middle core, said block having second and third passage means related to the left hand and right hand bores, respectively, and having ports opening thereto, the left and right hand cores having forward, intermediate, and rear ports registrable, at times with second and third passage means ports in forward and rear positions of the left and right hand cores, said left and right hand cores being adapted to close the ports of the second and third passage means in their intermediate positions, and fourth passage means in the block connecting the first, second, and third passage means together, said fourth passage means having a pressure line and a return line, and common passage means connecting the said passage means together, said hydraulic means comprising a hydraulic pump and a reservoir to which the pressure line and the return line are severally connected, and means connecting the pump and the reservoir, and pressure relief valve means in the block bridging the pressure and return lines at a point between said third and fourth passage means and the pump and reservoir.

4. In combination, a truck having a bed, a fixed axle spaced below the bed, resilient suspension means connected to and interposed between the bed and the axle, vertical hydraulic shock absorber jacks disposed at opposite sides of the truck, said jacks comprising cylinders and piston rods severally pivoted to the bed and the axle, and hydraulic fluid pressure and hydraulic fluid return means severally connected to the upper and lower ends of the jack cylinders, said hydraulic means comprising a control valve assembly, said assembly comprising a block formed with middle, left hand, and right hand bores extending therethrough, middle, left hand, and right hand valve cores sliding in the bores, said middle core being a two-position core and said left and right hand cores being three-position cores, first means for individually positioning and setting the middle core in a forward operative open position and a rear closed position, second means for positioning said left and right hand cores in open forward and rear open positions and in an intermediate closed position, said block having first passage means connected to the upper and lower ends of the jack cylinders and having ports opening to the middle bore, said middle core having port means registrable, in the forward position thereof with said first passage means ports, said middle core being adapted to close said first passage means ports in the rear position of the middle core, said block having second and third passage means related to the left hand and right hand bores, respectively, and having ports opening thereto, the left and right hand cores having forward, intermediate, and rear ports registrable, at times with second and third passage means ports in forward and rear positions of the left and right hand cores, said left and right hand cores being adapted to close the ports of the second and third passage means in their intermediate positions, and fourth passage means in the block connecting the first, second and third passage means together, said fourth passage means having a pressure line and a return line, and common passage means connecting the said passage means together, said first passage means having fluid flow adjusting means for determining the fluid resistance in the jack cylinders to movements of the piston rods relative to the cylinders.

5. In combination, a truck having a bed, a fixed axle spaced below the bed, resilient suspension means connected to and interposed between the bed and the axle, vertical hydraulic shock absorber jacks disposed at opposite sides of the truck, said jacks comprising cylinders and piston rods severally pivoted to the bed and the axle, and hydraulic fluid pressure and hydraulic fluid return means severally connected to the upper and lower ends of the jack cylinders, said hydraulic means comprising a control valve assembly, said assembly comprising a block formed with middle, left hand, and right hand bores extending therethrough, middle, left hand and right hand valve cores sliding in the bores, said middle core being a two-position core and said left and right hand cores being three-position cores, first means for individually positioning and setting the middle core in a forward operative open position and a rear closed position, second means for positioning said left and right hand cores in open forward and rear open positions and in an intermediate closed position, said block having first passage means connected to the upper and lower ends of the jack cylinders and having ports opening to the middle bore, said middle core having port means registrable, in the forward position thereof with said first passage means ports, said middle core being adapted to close said first passage means ports in the rear position of the middle core, said block having second and third passage means related to the left hand and right hand bores, respectively, and having ports opening thereto, the left and right hand cores having forward, intermediate, and rear ports registrable, at times with second and third passage means ports in forward and rear positions of the left and right hand cores, said left and right hand cores being adapted to close the ports of the second and third passage means in their intermediate positions, and fourth passage means in the block connecting the first, second and third passage means together, said fourth passage means having a pressure line and a return line, and common passage means connecting the said passage means together, said first passage means having fluid flow adjusting means for determining the fluid resistance in the jack cylinders to movements of the piston rods relative to the cylinders, and check valve means in said first passage means preventing return flow therethrough.

References Cited in the file of this patent
UNITED STATES PATENTS

| | | |
|---|---|---|
| 1,560,460 | Yates et al. | Nov. 3, 1925 |
| 1,760,891 | Wilkey | June 3, 1930 |
| 2,227,762 | Ronning | Jan. 7, 1941 |
| 2,486,087 | Wright | Oct. 25, 1949 |
| 2,834,599 | Sarchet | May 13, 1958 |
| 2,902,288 | Dill | Sept. 1, 1959 |